May 21, 1968     T. A. DAVIES ET AL     3,384,399
METAL-TO-GLASS SEAL
Filed Oct. 19, 1965
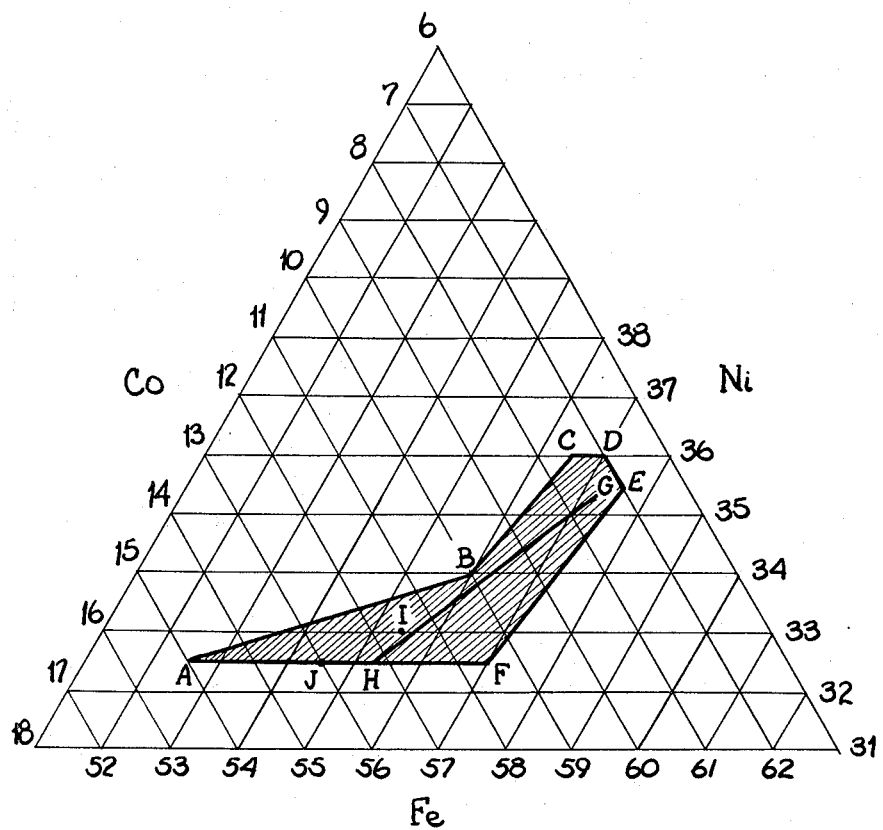
INVENTORS
TERENCE ARDERN DAVIES
BY THOMAS JOHNSON
M. L. Pinel
ATTORNEY

United States Patent Office 3,384,399
Patented May 21, 1968

3,384,399
METAL-TO-GLASS SEAL
Terence A. Davies, Walsall, and Thomas Johnson, Liverpool, England, assignors to The International Nickel Company, Inc., New York, N.Y., a corporation of Delaware
Filed Oct. 19, 1965, Ser. No. 497,675
Claims priority, application Great Britain, Oct. 22, 1964, 43,137/64
3 Claims. (Cl. 287—189.365)

ABSTRACT OF THE DISCLOSURE

Glass seal comprises a nickel-cobalt-iron alloy characterized by thermal expansion similar to the thermal expansion of borosilicate glass and by an austenitic gamma-phase structure that is resistant to phase transformation at low subzero temperatures.

---

The present invention relates to articles comprising metal joined to glass and, more particularly, to metal-to-glass seals and to alloys for use in metal-to-glass seals.

It is well known, that when metal must be bonded to glass in the manufacture of an article, the metal should have similar expansion characteristics to those of the glass. The boro-silicate glasses of the kind used as envelopes of high-powered electronic valves and X-ray tubes have a mean coefficient of thermal expansion of about $6.2 \times 10^{-6}$ per ° C. over the temperature range of 20–500° C., and the manufacturers of these valves and tubes and other equipment in which the glass is used specify that metal for making a metal-to-glass seal, e.g., for use as the material of the socket of such a valve or tube to be sealed in the boro-silicate glass envelope, shall have a mean thermal coefficient of expansion of from $5.95 \times 10^{-6}/°$ C. to $6.45 \times 10^{-6}/°$ C. over the same temperature range. In addition, it is also required that the inflection temperature of metal for such seals be from 420° C. to 450° C.

Heretofore, an alloy having the nominal composition of 29% nickel, 17% cobalt and 54% iron has been used for metal-to-glass seals. This is not the only alloy having the desired thermal expansion coefficient, e.g., United States Patent No. 2,217,421 discloses alloys containing from 23% to 34% nickel, 5% to 25% cobalt, less than 1% manganese and the remainder iron as suitable for bonding to boro-silicate glass and states that an alloy comprising 32% nickel, 16% cobalt, 0.08% manganese, carbon up to 0.10% and the remainder iron may be sealed successfully through boro-silicate glass having a coefficient of expansion of $6.2 \times 10^{-6}$ per degree centigrade.

In some electronic apparatus in which parts have been made of the alloys hitherto used, the glass envelopes have fractured in recent years most unexpectedly. These fractures have occurred during the transport of the apparatus at high altitude in aircraft and overland in very cold weather. It has been established that these fractures occur after a change of the structure of the glass seal alloy, sometimes referred to as a gamma-alpha transformation and also referred to as a transformation from austenite to martensite, with an accompanying change in the coefficient of thermal expansion. Once this transformation has occurred, the coefficients of thermal expansion of the glass and the metal no longer match one another, and if the seal is cooled to low temperatures, e.g., minus 80° C., the differential contraction produces so high a strain as to produce fracture. The nature of this detrimental phase transformation is not understood and the causes are complex. Many factors may have an effect, including, for example, the amount of cold work performed on the alloy, residual stresses in the seal and the thermal history of the alloy, in addition to the temperatures to which the alloy is subjected when in use. Thus, control of an alloy composition in a boro-silicate metal-to-glass seal so as to provide an alloy having a stable structure which is not susceptible to detrimental phase transformation and which is characterized by the required expansion coefficient and inflection temperature has hitherto been a complex unsolved problem.

Although many attempts have been made to overcome the foregoing difficulties and other difficulties and disadvantages, none, as far as we are aware, was entirely successful when carried into practice commercially on an industrial scale.

It has now been discovered that a nickel-cobalt-iron alloy of a specially controlled composition is characterized by a stable austenitic structure at any low atmospheric temperature to which parts composed of the alloys are likely to be subjected.

It is an object of the invention to provide a metal-to-glass seal in an article which is subjected to low temperatures when in transport or use.

It is another object of the invention to provide an alloy for metal-to-glass seals.

It is a further object of the invention to provide a process for making a glass seal alloy.

Other objects and advantages will become apparent from the following description taken in conjunction with the accompanying drawing in which the figure is a portion of a ternary diagram whereon the relation of the percentage of nickel to the percentage of cobalt and to the percentage of iron for alloy compositions in accordance with the invention is depicted.

Generally speaking, the present invention is directed to a metal-to-glass seal comprising a metal component made of a ternary nickel-cobalt-iron alloy having a composition within the area bounded by the line ABCDEFA in the portion of the ternary diagram shown in the accompanying drawing and a glass component having the thermal expansion characteristics of boro-silicate glass. The alloy for the seal is characterized by a mean thermal expansion coefficient of about $5.95 \times 10^{-6}$ per ° C. to about $6.45 \times 10^{-6}$ per ° C. over the temperature range of 20° C. to 500° C. and is further characterized by a stable, austenitic, gamma-phase structure which does not transform when subjected to commercial conditions encountered in production and use of metal-to-glass seals, even when cooled to sub-zero temperatures. The alloy is an essentially ternary alloy characterized by a controlled high purity condition obtained by high purity alloy production techniques such as vacuum melting techniques and powder metallurgical techniques and any impurities which may unavoidably be present in the alloy despite the use of such special techniques are maintained very low, otherwise the required characteristics are not obtained. Accordingly, the alloy contains not more than 0.1% molybdenum, not more than 0.05% chromium, not more than 0.1% manganese, not more than 0.2% silicon and not more than 0.06% carbon.

In the accompanying drawing, it is to be noted that the points defining the perimeter of the alloy composition area for metal in seals contemplated by the invention have the ternary coordinates set forth in Table I. The alloy composition area referred to herein as bounded by, included by or within the boundary line ABCDEFA includes alloy compositions falling on the boundary line. All alloy composition percentages set forth herein are by weight.

TABLE I

| Point | Ni (Percent) | Co (Percent) | Fe (Percent) |
|---|---|---|---|
| A | 32.5 | 15 | 52.5 |
| B | 34.0 | 10 | 56.0 |
| C | 36.0 | 7.5 | 56.5 |
| D | 36.0 | 7.0 | 57.0 |
| E | 35.5 | 7.0 | 57.5 |
| F | 32.5 | 10.5 | 57.0 |

In carrying the invention into practice, it is advantageous that the metal in the seal be of an essentially ternary alloy composition consisting of about 32.5% to about 33% nickel, about 11.5% to about 13% cobalt with balance essentially iron in an amount not less than about 54.5% and not greater than about 55.5%. Accordingly, an alloy composition in this advantageous range has a nickel-plus-cobalt content of about 44.5% to about 45.5%. Chemical compositions of two especially advantageous alloys, Alloys I and J, are set forth in Table II. Alloy I is particularly advantageous where it is required that the metal for a seal in accordance with the invention have a thermal expansion coefficient of about $6.2 \times 10^{-6}$ per ° C. when in the vacuum melted condition. Alloy composition J is especially advantageous for powder metallurgically produced alloys in order to insure that the metal in the seal has characteristics especially compatible with medium-hard glasses of the borosilicate type and does not develop detrimental metallurgical phases such as the martensitic alpha phase.

TABLE II

| Alloy | Ni (Percent) | Co (Percent) | Fe (Percent) |
|---|---|---|---|
| I | 33 | 11.5 | 55.5 |
| J | 32.5 | 13 | 54.5 |

Alloys of such compositions as to lie about on the line shown in the drawing as line GH, illustrating alloys in which the percent cobalt plus 1.67×the percent nickel is about 66.4%, have a mean thermal expansion coefficient of about $6.2 \times 10^{-6}$ per ° C. between 20° C. and 500° C. and are advantageous for use where this particular expansion coefficient is required.

Alloys for seals provided by the invention can be prepared from high purity raw materials by vacuum melting or by powder metallurgical techniques to provide alloys having the requisite high purity including low contents of gases detrimental to workability, e.g., gases such as oxygen, and can be wrought into shapes and sizes required for metal-to-glass seals. Alloys having compositions for metal-to-glass seals contemplated herein are satisfactorily sealed to glass by glass seal techniques known in the art for sealing other nickel-cobalt-iron alloys to glass.

Chemical compositions of other examples of the alloy for the seal of the invention are set forth in Table III. Alloys of compositions in Table III, when in the vacuum melted condition, had inflection temperatures shown in the table and were characterized by thermal expansion coefficients in the range $5.95 \times 10^{-6}$ per ° C. to $6.45 \times 10^{-6}$ per ° C. in accordance with the invention.

TABLE III

| Alloy | Co (Percent) | Ni (Percent) | C (Percent) | Si (Percent) | Mn (Percent) | S (Percent) | Fe | I.T. (° C.) |
|---|---|---|---|---|---|---|---|---|
| L | 10.95 | 33.0 | .006 | <.10 | <.10 | 0.003 | Bal | 422 |
| M | 11.2 | 33.3 | .005 | <.10 | <.10 | <.002 | Bal | 430 |
| N | 10.1 | 33.9 | .005 | <.10 | <.10 | 0.003 | Bal | 421 |
| O | 7.85 | 34.9 | .006 | <.10 | <.10 | <.002 | Bal | 420 |
| P | 7.1 | 35.9 | .008 | <.10 | <.10 | 0.003 | Bal | 420 |

Bal.=Balance essentially.
I.T.=Inflection Temperature.

It has been found that air melted alloys are not satisfactory for the seal of the invention. Air melted alloys are outside the scope of the invention. For instance, an alloy (referred to herein as Alloy X) was made by air melting to the composition 32.7% nickel, 11% cobalt and balance iron using particular care to maintain impurities such as manganese and carbon as low as possible. Chemical analysis of air melted Alloy X showed 0.027% carbon and less than 0.05% manganese present in the alloy. Test results showed that Alloy X, when in the air-melted condition and thus not in accordance with the invention, had an inflection temperature of 396° C., which is too low to meet the glass seal alloy requirement for an inflection temperature of 420° C. to 450° C., and had a mean thermal coefficient of expansion over the range 20° C. to 500° C. of $5.74 \times 10^{-6}$ per ° C., which is unsatisfactorily low for metal-to-glass seals of the invention.

The present invention is not to be confused with glass seal metals which, while sometimes possessing a thermal expansion coefficient of $5.95 \times 10^{-6}$ per ° C. to $6.45 \times 10^{-6}$ per ° C., do not contain nickel, cobalt and iron in amounts in accordance with the invention. Although some alloys have the desired coefficients of expansion when in optimum conditions, the problem of providing a stable alloy which does not undergo detrimental phase transformation has not been overcome with known alloys for glass seals. For instance, an alloy containing 32% nickel, 16% cobalt and balance iron has a mean thermal coefficient of expansion of $5.95 \times 10^{-6}$ per ° C. to $6.45 \times 10^{-6}$ per ° C. over the temperature range 20° C. to 500° C. but is not stably austenitic at low temperatures and use thereof for glass seals does not insure avoiding phase transformations which are detrimental to the expansion characteristics of the alloy and thus render it unsatisfactory for use in a seal with boro-silicate glass.

The present invention is particularly applicable in the production of electronic valves and X-ray tubes comprising metal-to-glass seals.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and appended claims.

We claim:

1. A metal-to-glass seal comprising a glass component having thermal expansion characteristics of boro-silicate glass and a metallic component made of a high purity, essentially ternary, nickel-cobalt-iron alloy consisting of 32.5% to 36% nickel, 7% to 15% cobalt and with the balance essentially iron in an amount not less than 52.5% and not greater than 57.5%, having said nickel, cobalt and iron in proportions providing a composition included by the area bounded by the line ABCDEFA on the accompanying drawing and characterized by a stable gamma-phase structure, by a mean thermal coefficient of expansion of $5.95 \times 10^{-6}$ per ° C. to $6.45 \times 10^{-6}$ per ° C. over the range of 20° C. to 500° C. and by an inflection temperature of 420° C. to 450° C.

2. A metal-to-glass seal as set forth in claim 1 wherein said metallic component is a vacuum-melted alloy consisting essentially of about 33% nickel, about 11.5% cobalt and about 55.5% iron.

3. A ternary nickel-cobalt-iron alloy consisting essentially of about 32.5% to about 33% nickel, about 11.5% to about 13% cobalt with balance essentially iron in an amount not less than 54.5% and not greater than 55.5% of the alloy, said alloy being a high purity alloy with not more than 0.1% molybdenum, not more than 0.05% chromium, not more than 0.1% manganese, not more than 0.2% silicon and not more than 0.06% carbon and being characterized by a stable gamma-phase structure, a mean thermal expansion coefficient of $5.95 \times 10^{-6}$ per ° C. to $6.45 \times 10^{-6}$ per ° C. over the range 20° C. to 500° C. and an inflection temperature of 420° C. to 450° C.

References Cited

UNITED STATES PATENTS

| 1,942,260 | 1/1934 | Scott | 75—123 |
| 2,062,335 | 12/1936 | Scott | 75—123 |
| 2,217,421 | 10/1940 | Scott | 75—123 |

OTHER REFERENCES

H. Scott, Expansion Properties of Low-Expansion Fe-Ni-Co Alloys, AIME Transactions, Institute of Metals Division, pages 509 and 513, TNIA53.

L. L. Wyman, Low-Temperature Transformation in Iron-Nickel-Cobalt Alloys, AIME Transactions, Iron & Steel Division, pages 542, 543, TS 300A35.

EDWARD C. ALLEN, *Primary Examiner.*